UNITED STATES PATENT OFFICE.

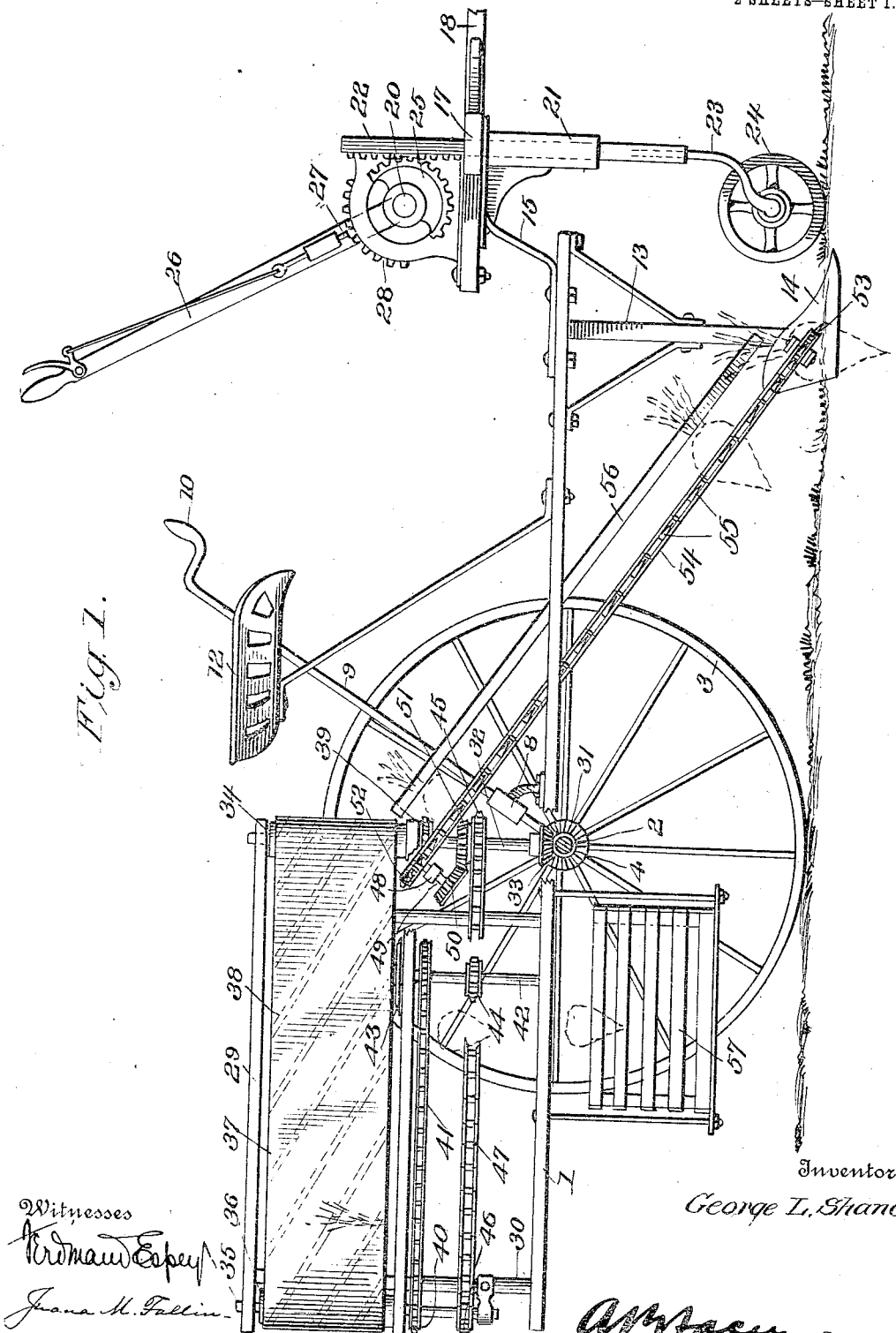

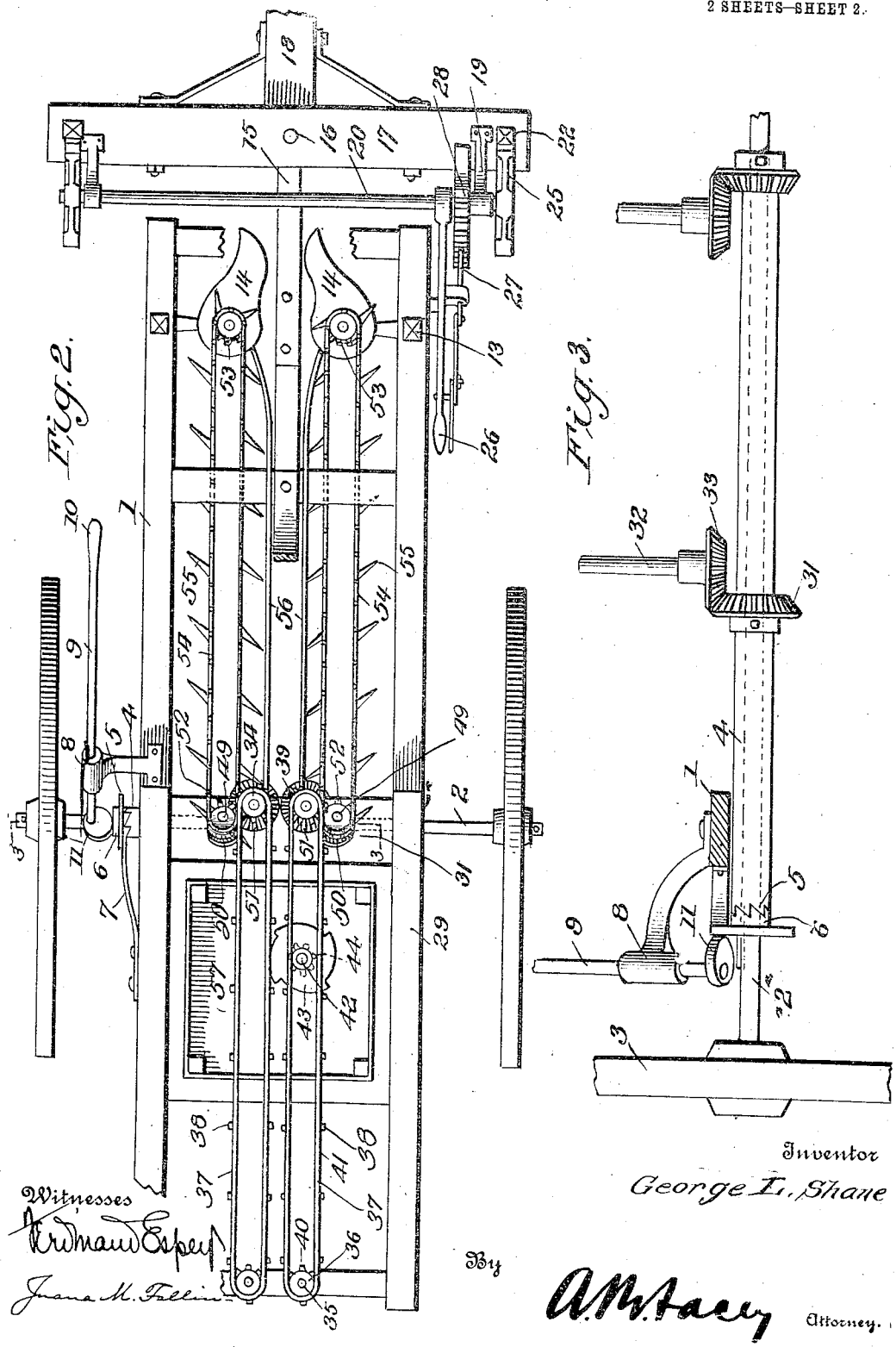

GEORGE L. SHANE, OF PIQUA, OHIO.

BEET-HARVESTER.

1,067,378.  Specification of Letters Patent.  Patented July 15, 1913.

Application filed October 31, 1911. Serial No. 657,874.

*To all whom it may concern:*

Be it known that I, GEORGE L. SHANE, citizen of the United States, residing at Piqua, in the county of Miami and State of Ohio, have invented certain new and useful Improvements in Beet-Harvesters, of which the following is a specification.

This invention relates to beet harvesters, and has for its object to provide a machine of simple structure adapted to be drawn along a row of beets and dig the same successively from the soil, elevate them and remove the tops and foliage from them.

A further object of the invention is to provide a simple and an effective means for carrying the tops and foliage to the rear part of the machine and ejecting the same. The beets after relieved of the tops and foliage are permitted to fall in a suitable receptacle carried by the machine.

Further objects and advantages will appear in the following description, it being understood that various changes in construction, arrangement and proportions of the parts may be resorted to within the scope of the appended claim.

For a full understanding of the invention reference is to be had to the following description and accompanying drawings, in which:

Figure 1 is a side elevation of the harvester; Fig. 2 is a top plan view of the same; and Fig. 3 is a detailed sectional view of part of the same cut on the line 3—3 of Fig. 2.

Corresponding and like parts are referred to in the following description and indicated in all the views of the accompanying drawings by the same reference characters.

The machine consists of a frame 1 mounted upon an axle 2, to the ends of which are fixed ground wheels 3. A sleeve 4 is loosely mounted upon the intermediate portion of the axle 2 and is provided with a clutch end 5. A clutch member 6 is feathered upon the shaft 2 and is engaged by one end of a spring 7, the other end of which is fixed to the side of the frame 1. The tension of the spring 7 is such as to normally hold the clutch member 6 away from the clutch end 5 of the sleeve 4. A bracket 8 is carried at the side of the frame 1 and a shaft 9 is journaled in the said bracket. The said shaft is provided at its upper end with a crank handle 10 and at its lower end with an eccentric 11 which bears against the side of the clutch member 6. Therefore it will be seen that by rotating the shaft 9 and turning the eccentric 11 the clutch member 6 may move into engagement with the clutch end 5 of the sleeve 4, whereby the said sleeve and its attachments are caused to rotate in unison with the axle 2. An operator's seat is mounted upon the forward portion of the frame 1 and is indicated by the numeral 12.

Standards 13 depend from the forward portion of the frame 1 and carry digging shares 14 at their lower ends. These shares are spaced from each other. A draft bar 15 is connected at its rear portion with the forward end of the frame 1 and is pivotally connected at its forward end by means of a king bolt 16 with the cross bar 17 of a tongue truck. A tongue 18 is connected at its rear end with the cross bar 17. Brackets 19 are carried by the cross bar 17 and a shaft 20 is journaled in the said brackets. Sleeves 21 depend from the end portions of the cross bar 17 and rack bars 22 are slidably mounted in the said sleeves. Caster frames 23 are pivotally connected with the lower ends of the rack bars 22 and carry caster wheels 24 which are journaled for free rotation. Gear segments 25 are fixed to the end portions of the shaft 20 and mesh with the teeth of the rack bars 22. A lever 26 is fixed to the intermediate portion of the shaft 20 and carries a spring actuated pawl 27 which is adapted to engage the teeth of a gear segment 28 which is supported upon the cross bar 17. Therefore it will be seen that by swinging the lever 26 the gear segments 25 in mesh with the rack bars 22 will move the said rack bars vertically, whereby the caster wheels 24 at the lower ends of the bars are elevated or depressed, and consequently the forward portion of the frame 1 may be raised or lowered so that the shares 14 may cut below the surface of the soil at any desired depth, or may be lifted entirely above the surface of the soil.

A frame 29 is supported above the rear end portion of the frame 1 by means of uprights 30. Beveled gear wheels 31 are fixed to the intermediate portion of the sleeve 4. Vertical parallel shafts 32 are journaled for rotation at the forward portion of the frame 29 and carry beveled pinions 33 at their lower ends which mesh with the beveled pinions 31 mounted upon the sleeve 4. The shafts 32 are arranged to rotate toward each other with their inner portions turning in a direction rearwardly of the machine. Rollers 34 are mounted upon the shafts 32 below the frame 29. Vertically disposed parallel shafts 35 are journaled for rotation at the rear portion of the frame 29 and carry rollers 36. Belts 37, of canvas or other pliable material, are arranged to move around the rollers 34 and 36 and are located one at each side of the machine. The inner runs of these belts move rearwardly of the machine as the machine moves in a forward direction. The belts 37 are provided upon their work engaging faces with strips of flexible material 38, diagonally arranged and which constitute corrugations or exserted portions adapted to engage the foliage of the beets and securely hold the same as the foliage and beet tops are carried to the rear of the machine, as will be explained hereinafter.

Sprocket wheels 39 are fixed to the shafts 32 and sprocket wheels 40 are fixed to the shafts 35. Sprocket chains 41 are trained around the wheels 39 and 40 and are adapted to transmit rotary movement from the shafts 32 to the shafts 35, whereby the belts 37 are positively moved between the rollers 34 and 36.

A vertically disposed cutter shaft 42 is journaled upon the intermediate portion of the frame 1 and carries at its upper end a knife 43 which is located below the lower edges of the belts 37 and extends across the space between the inner runs of the said belts at the opposite sides of the machine. The blade 43 may be of any desired pattern, and if desired two or more blades and cutting shafts may be employed. A sprocket wheel 44 is fixed to the shaft 42 and a sprocket wheel 45 is fixed to one of the shafts 32. A sprocket wheel 46 is fixed to one of the shafts 35 and a sprocket chain 47 is trained around the sprocket wheels 45 and 46 and the inner run of the said chain engages the inner portion of the periphery of the wheel 44, whereby the said wheel 44 together with the shaft 42 and blade 43 is rotated as the chain 47 moves around the wheels 45 and 46. Brackets 48 are supported at the forward portion of the frame 29 and carry stub shafts 49 which are inclined forwardly at their upper ends. Beveled pinions 50 are fixed to the lower ends of the shafts 49 and mesh with beveled pinions 51 which are fixed to the intermediate portions of the shafts 32. Sprocket wheels 52 are fixed to the upper ends of the shafts 49 and sprocket wheels 53 are journaled at the rear portions of the shares 14. Sprocket chains 54 are located at the opposite sides of the machine and are trained around the sprocket wheels 52 and 53. The chains 54 carry pins 55. Forwardly and downwardly inclined guides 56 are provided above the chains 54 and over the space between the inner run thereof. The forward ends of the guides 56 diverge from each other and the rear ends of the said guides terminate at the forward or receiving ends of the belts 37. The parts are so arranged that the inner runs of the chains 54 move rearwardly as the machine moves in a forward direction.

The operation of the machine is as follows: As it is drawn along a row of beets, the beets are received between the shares 14 and the said shares loosen the earth and lift the beets. The pins 55 carried by the chains 54 stick into the opposite sides of the beets and lift them from the soil and carry them up with the foliage of the beets between the guides 56. When the beets arrive at the upper ends of the guides, the foliage is engaged by the inner runs of the belts 37 and the beets are carried along toward the blade 43. As they come in contact with the said blade the tops and foliage are cut from the body portions of the beets and the beets fall into a receptacle 57 which is carried at the under part of the rear portion of the frame 1, while the foliage and tops are carried rearwardly by the inner runs of the belts 37 and are ejected from the rear end of the machine upon the ground. By reason of the inclination of the cleats or strips 38 they have a tendency to lift the foliage and tops during the cutting operation and also at the time that the beet tops are admitted between the said belts. The lifting of the tops during the cutting operation facilitates this operation inasmuch as the tops and foliage do not rest upon the upper surface of the blade 43. Therefore it will be seen that a simple and effective machine for digging and lifting beets from the soil is provided, also an effective means is provided for easily and quickly removing the tops and foliage from the beets and separating the parts so that the tops and foliage may be discarded while the body portions of the beets are collected in a receptacle provided for their reception.

Having thus described the invention, what is claimed as new is:

In a harvester a topping mechanism comprising vertically disposed shafts, belts trained around the shafts and having opposed runs, strips secured to the work engaging surfaces of the belts and disposed at acute angles to the lengths of the runs of the belts, chains operatively connecting the shafts together, a shaft journaled below the belts, a knife carried at the upper end of said shaft and located below the runs of said belts, and a wheel mounted upon the last-mentioned shaft and engaging one of the said chains.

In testimony whereof I affix my signature in presence of two witnesses.

GEORGE L. SHANE. [L. S.]

Witnesses:
  MYRTLE FRANCIS,
  G. W. HUNT.